Nov. 3, 1959     H. WALTER     2,910,827
PULSE EQUALIZING ENERGY CONVERTER
Filed Oct. 14, 1955     3 Sheets-Sheet 1

HELLMUTH WALTER
*INVENTOR.*

BY *Daniel H. Bobis*
          *Atty*

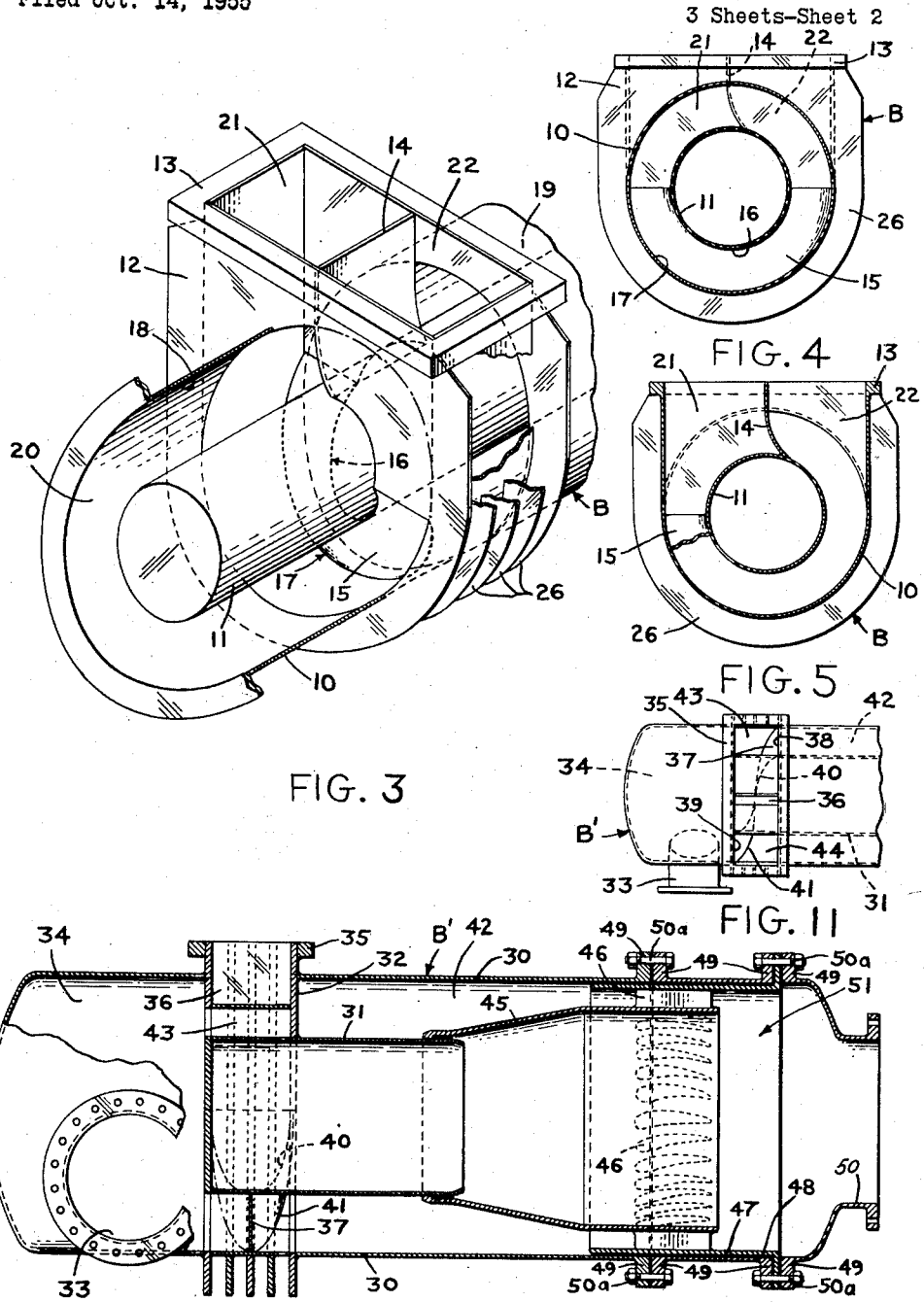

Nov. 3, 1959 H. WALTER 2,910,827
PULSE EQUALIZING ENERGY CONVERTER
Filed Oct. 14, 1955 3 Sheets-Sheet 3

HELLMUTH WALTER
INVENTOR.

BY Daniel A. Bobis
atty

United States Patent Office 2,910,827
Patented Nov. 3, 1959

2,910,827

PULSE EQUALIZING ENERGY CONVERTER

Hellmuth Walter, Upper Montclair, N.J., assignor to Worthington Corporation, Harrison, N.J., a corporation of Delaware Application October 14, 1955, Serial No. 540,481

8 Claims. (Cl. 60—29)

This invention relates generally to a rotary type combustion engine and more particularly to a means coacting therewith to admit the air to the engine, collect the exhaust, mix it with the excess air, equalize the velocity of the exhaust gases, and to make the kinetic energy of the exhaust gases available for conversion into mechanical energy or pressure.

In rotary type internal combustion engines, such as is shown in my co-pending application Serial No. 435,014, filed May 27, 1954, now Patent No. 2,794,429, issued June 4, 1958, the combustion gases exhaust from the engine in pulses.

These pulses of exhausting gas contain recoverable energy which can be utilized for example, to aid the charging of the rotary internal combustion engine itself at atmospheric pressure; to drive a turbine, etc. However, in order to obtain efficient operation or use of these pulses of exhausting gas, it is preferable and desirable to collect and pass the gases to their use at substantially constant velocity, substantially constant pressure and substantially constant temperature.

The present invention meets this problem by providing means having a large volume inlet communicating with the inlet of the engine and a swirl chamber communicating with the outlet of the engine, the swirl chamber being so constructed that it forms a rotating mass of gas or a vortex of rotating gas which receives at one end the pulses of exhausting gases from the outlet of the engine, and delivers these gases at the other end at substantially uniform or constant velocity, pressure and temperature; to any suitable device for converting the kinetic energy of this rotating mass of gases at substantially constant velocity, pressure, and temperature into energy for the desired use.

Accordingly, it is an object of the present invention to provide a pulse equalizing energy converter for gases delivered in pulses whereby the kinetic energy of the gas will be available for conversion into usable energy for any suitable purpose.

Further objects and advantages of the invention will become evident from the following description with reference to the accompanying drawings in which:

Figure 3 is a perspective view partly in section of a portion of the exhaust pulse equalizing energy converter shown in Figure 1.

Figure 4 is a cross-section taken on line 4—4 of Figure 1.

Figure 5 is a cross-section taken on line 5—5 of Figure 1.

Figure 10 is a vertical section partly in side elevation of the form of the exhaust pulse equalizing energy converter shown in Figure 8.

Figure 11 is a partial plan view showing the partition.

Figure 1:
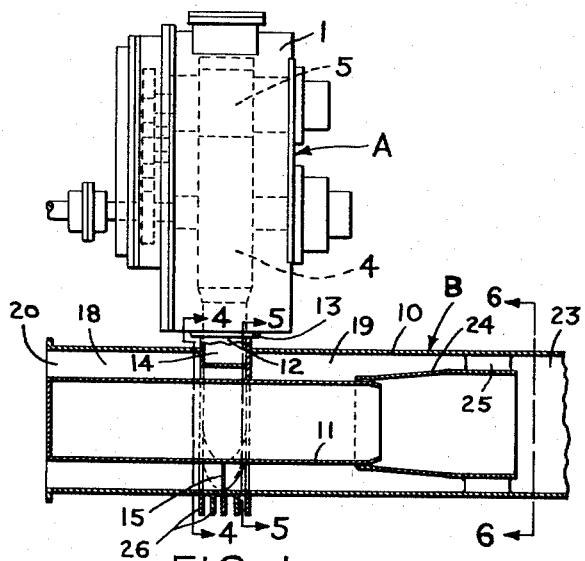
Figure 1 is a side elevation partly in section showing a rotary internal combustion engine with one form of exhaust pulse equalizing energy converter thereon.
Figure 2:
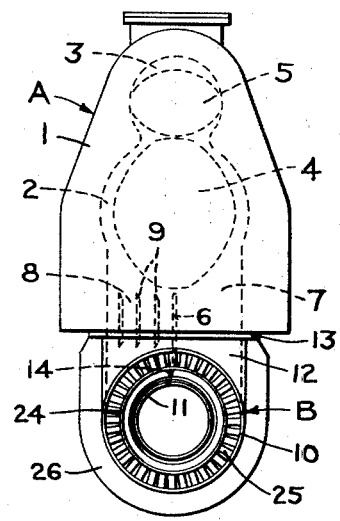
Figure 2 is an end view of the invention as shown in Figure 1.

Referring to the drawings, Figures 1 and 2 show one of the forms of the present invention, it being understood that all forms of the present invention are adapted to enable the rotary internal combustion engine to be operated with air delivered at atmospheric pressure as well as other useful purposes.

Thus the rotary internal combustion engine generally designated A which is more fully shown and described in my co-pending application Serial No. 435,014, filed May 27, 1954, now Patent No. 2,794,429, includes a block or housing 1 having a main chamber 2 and a small or combustion chamber 3 in which are rotatably mounted a respective main lobe 4 and combustion lobe 5. The main chamber 2 communicates with the small or combustion chamber 3, and at a point remote from this point of communication has an opening with a partition 6 therein which forms an inlet 7 and an exhaust outlet 8 adjacent each other.

In operation, the rotary internal combustion engine is initially turned over by compressed air or a small prime mover (not shown). Portions of air are charged through the inlet 7 into one side of the main chamber where each portion is picked up and compressed by rotation of and coaction between the main lobe 4 and the combustion lobe 5 into a combustion space formed in the combustion chamber 3 each time that the combustion lobe 5 reaches the position indicated in Figure 2 of the drawings.

If fuel is now fed to each charge and combustion effected as by a spark or other suitable means of ignition, the expansion of the combustion gases deliver power to the respective lobes causing them to rotate and at the same time allows the gas to expand through the main chamber 2 on the side of the chamber opposite from the initial air charging side, whence the cycle is completed by the combustion gases exhausting through the exhaust outlet 8. This cycle repeats itself, the exhaust gases thus exhausting in pulses from the exhaust outlet 8, the description and operation of the rotary internal combustion engine illustrated herein being more fully treated in my abovementioned patent.

The partition 6 is so disposed with respect to the end of the main lobe that the inlet 7 and exhaust outlet 8 are in continuous communication with each other. Hence, during the exhausting portion of one cycle and the charging portion of the succeeding cycle by reason of the adjacent relationship of the inlet 7 and exhaust outlet 8 and their communication with each other, an ejector action occurs which assists incoming air to charge the engine and simultaneously to mix and cool the exhausting gases. The vanes 9 in the exhaust outlet also act to assist this ejector action.

The addition of the pulse equalizing energy converter to this system will increase this ejector effect by increasing the differential pressure which exists between the inlet 7 and exhaust outlet 8 during such periods and thus effectively provides means for charging the engine for efficient operation at atmospheric pressure.

It will be understood that one of the many purposes of the present invention relative to charging the engine at atmospheric pressure is to create a differential pressure between the exhausting gases and the incoming charging air. Hence, while the present application shows the preferred embodiment as applied to a rotary type internal combustion engine, it is also applicable to other types of internal combustion engines, the communication between the inlets and exhaust outlets being established by regulating the respective opening and closing times for the valving arrangements for such inlets and exhaust outlets on the internal combustion engine.

*Exhaust pulse equalizing energy converter—Figure 1*

The exhaust pulse equalizing energy converter shown in Figures 1 to 6 and generally designated B, is an elongated cylindrical member which comprises an outer cylindrical tube or hollow vessel 10 and an inner cylindrical tube or member 11 of a lesser diameter which is mounted in the outer cylindrical tube substantially concentric therewith.

Disposed transversely of the inner and outer cylindrical tubes is a housing generally designated 12 having a flange 13 which provides means for connecting the converter B to the rotary internal combustion engine at the point where the inlet 7 and exhaust outlet 8 are formed thereon, as is clearly shown in Figures 1 and 2 of the drawings.

Figures 3, 4, and 5 show a radially extending vane 14 and a helically extending vane 15 in said housing 12.

The radially extending slightly arcuate vane 14 is disposed in a plane substantially perpendicular to the axial line of said pulse equalizing energy converter and extends transversely of the housing 12 from the outer circumference of the inner cylindrical tube 11 to the face of the flange 13 so that in operative position the vane 14 and the partition 6 are in alignment with each other.

The helically extending vane 15 is connected at one end to one side of the housing and at the other end to the opposite side of the housing. The inner helix of the vane 15 being connected as at 16 to the outer circumference of the inner tube 11 and the outer helix as at 17 to the inner circumference of the outer cylindrical tube 10.

The radially extending vane 14 and the helically extending vane 15 in the housing 12 act to divide the annular space formed between the inner and outer cylindrical tubes 10 and 11 respectively, into an annular inlet chamber 18 and an annular outlet or swirl chamber 19. In the preferred form and as shown in Figure 3 of the drawings the partition comprising the helical vane 15 is mounted in spaced relation with the rotary combustion engine and connected in the tube in order to separate the inlet air from the exhaust gases. In this position the inner portion of the partition functions to direct inlet fluid into a passage 21 which is associated with the engine inlet 7 and the other opposite side of the partition or vane 15 directs exhaust gases flowing into passage 22 from exhaust outlet 8 into the swirl chamber. With this construction the partition provides the necessary helical motion to the exhaust gases entering the swirl chamber and yet does not extend into the chamber to hinder the axial expansion of the pulses of exhaust gases which finally coalesce in the swirl chamber into a mass of usable energy available for conversion into mechanical energy.

In the form of the present invention as shown in Figure 1, the inner cylindrical tube extends to a point adjacent the intake end of the pulse equalizing energy converter B to form an opening 20. In the present instance, this opening is shown concentric to the axial line of the pulse equalizing energy converter and thus entering air will follow a swirl-like path by reason of this construction coupled with the somewhat arcuate shape of the radial vane 14 and the helical shaped vane 15. It will be understood, however, that air could be admitted tangentially to the axial line of the pulse equalizing energy converter B to produce the same result, as is indicated in the form of the invention shown in Figure 9 of the drawings.

The annular inlet chamber 18 communicates through the connecting passage 21 with the inlet 7 of the rotary internal combustion engine so that air may be freely admitted to the compression space of the main chamber during each combustion cycle.

The annular outlet or swirl chamber 19 likewise communicates at one end through a connecting passage 22 with the exhaust outlet 8 for the rotary engine A, and at a point remote from this connecting passage 22 is provided a discharge outlet generally designated 23, as is clearly shown in Figure 1 of the drawings.

Thusly as is shown in Figure 1 the partition including the vanes 14 and 15 serves to separate the inlet fluid from the exhaust gases. In this position inlet fluid is directed into the engine inlet along one side of the partition and exhaust gases are directed into the swirl chamber along the other opposite side of this partition.

Medially along the swirl chamber 19, slidably mounted between the inner cylindrical tube 11 and the outer vessel 10 is a frusto-conical element 24. This element can be set to any predetermined position and acts to narrow the radial width or area of the swirl chamber 19 as it approaches the discharge outlet 23. The effect of narrowing the annular outlet or swirl chamber 19 is to increase the axial component of velocity of the exhausting gases whereby the swirl angle will be such that circumferentially disposed diffuser elements 25 mounted adjacent the end of the member 24 nearest the outlet 23 may be properly positioned to coact with the exhausting gases and thus obtain efficient conversion of the kinetic energy of the gases to the desired use.

The frusto-conical element 24 is positioned so that the length of the annular outlet or swirl chamber 19 is tuned to produce the maximum energy conversion when the gases are passed through the diffuser element 25. This, of course, in a practical sense is generally done empirically because there are so many variables which can effect this relationship. For example, the temperature effect caused by the spilled air admitted with the exhausting gases into the pulse equalizing energy converter; the effect on the pulses of exhausting gases produced by variations in the pressure of the admitted charging air; the effect on the pulses produced by the internal compression ratio of the internal combustion engine itself, and the expansion point established by the timing of the opening of the exhaust outlets for the internal combustion engine are some of these variables. As a general rule, however, it has been found that the length is a function of the relative size of the mean cross sectional area of the annular outlet of swirl chamber 19. Thus, the narrower the chamber the longer it must be before the gases forming the rotating mass therein will have reached substantially constant velocity, constant pressure and constant temperature. Conversely, if the size of the cross-sectional area increases the swirl chamber of the converter will have a shorter length up to certain limits.

Figure 12:
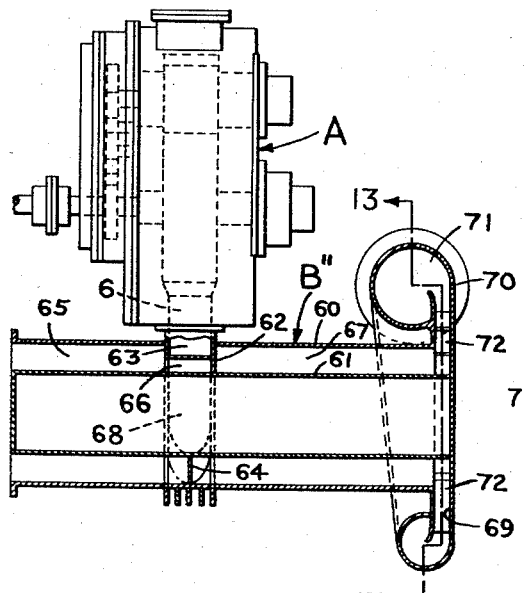
Figure 12 is a side elevation partly in vertical section showing a rotary internal combustion engine with still another form of exhaust pulse equalizing energy converter thereon.
Figure 13:
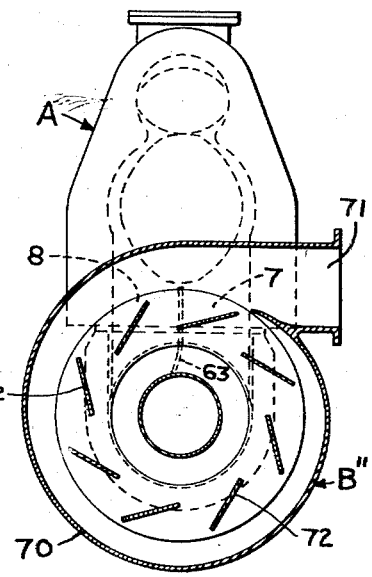
Figure 13 is an end view showing the diffuser means in vertical section taken on line 13—13 of Figure 12.

It will be understood that while a specific axially disposed diffuser is shown, that a radial diffuser could also be utilized to accomplish the present result, as is illustrated in Figures 12 and 13 of the drawings.

*Operation of pulse equalizing energy converter B shown in Figure 1*

The engine is placed in operation as above described.
Air is continuously delivered through the opening 20. The air may be at atmospheric pressure or at super-atmospheric pressure as is desired although the present form of the invention specifically adapts the engine to operate with air at atmospheric pressure, it being obvious that if air is delivered at super-atmospheric pressure that it will act to supercharge the engine and increase its performance as in the case of other internal combustion engines.

The air enters the annular inlet chamber 18 and assumes a swirling path discharging into the connecting passage 21 when it passes to the inlet 7 of the rotary engine where portions are passed through successive combustion cycles as above described.

The exhausting gases expand in pulses through the exhaust outlet 8 to the connecting passage 22, the velocity of the exhaust gases leaving the engine varying periodically during each cycle within wide limits due to the changing pressure in the expansion space of the engine during the discharge process.

In addition, as the exhaust gases at high velocity pass the vanes 9 and the partition 6, an ejector effect is originated and as has been above described, if the main lobe 4 is in the beginning portion of the succeeding combustion cycle, entering air will be drawn into the exhaust outlet 8 with the exhaust gases whence it also passes to the connecting passage 22.

The mixing of the expanding combustion gases with intake air will act to cool the combustion gases so that the pulse equalizing energy converter will not have to be made of any special heat resistant materials.

Figure 8:
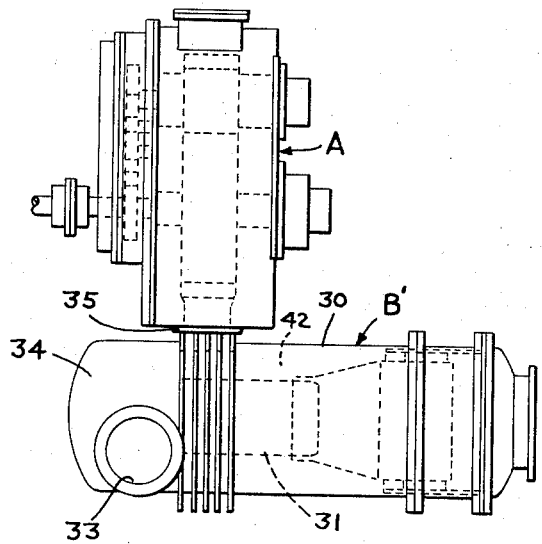
Figure 8 is a side elevation showing a rotary internal combustion engine with another form of exhaust pulse equalizing energy converter thereon.

A plurality of structural support fins 26 are provided about the housing as is shown in Figures 1, 8 and 12 of the drawings to strengthen the converter.

From the connecting passage 22 the pulse of combustion gases and intake air is passed to the annular outlet or swirl chamber 19 tangentially by reason of the offset position of the passage 22 and the helical vane 15.

In the swirl chamber 19 the combustion gases and air are thoroughly mixed and caused to flow or follow a path in the form of a vortex in which the circumferential velocity is relatively high as compared to the axial velocity of the gases as they travel towards the outlet 23 of the swirl chamber 19.

However, after passing a short axial distance in the swirl chamber towards the outlet 23 the particles of the exhaust gases for any given radius assume a velocity according to the law of free vortex $$v = \frac{c}{r}$$

where $v$ = circumferential or tangential velocity of particle
$c$ = a constant
$r$ = radial distance of particle from center of converter Thus, after passing axially a short distance along the swirl chamber 19 the combustion gases have been cooled by mixing with the intake air and the mixture has become a mass of rotating gas at substantially uniform average velocity constantly receiving pulses of the expanding combustion gases and intake air at one end and delivering the mixture of cooled gases at substantially uniform velocity, pressure and temperature at the opposite end available for conversion to usable energy.

This conversion is actually accomplished by the mixture of gases advancing through the narrowed portions of the swirl chamber 19 and passing through the diffuser elements 25. As the gases enter the turning and diffuser vanes 25 the peripheral component of the gas velocity will be changed to pressure so that the mean static pressure at the pulse equalizing energy converter outlet 23 after the cascade of diffuser elements 25 is higher than the mean static pressure in the swirl chamber 19.

If the exhaust gases discharge to atmosphere, then the mean static pressure of the gases before they enter the diffuser elements will be below atmospheric pressure. Thus the entering or intake air is now drawn into the engine by the combined action of the suction of the main lobe, the ejector effect in the exhaust outlet, and the differential pressure created by the swirl chamber. Thus, delivery of air at atmospheric pressure may be effected and a blower is not necessary for efficient operation of the engine A.

*Pulse equalizing energy converter B' shown in Figure 8*

In the form of the invention shown in Figure 8, the pulse equalizing energy converter varies in that the intake air is introduced tangentially into a chamber, and the predetermined length of the narrow portion of the swirl chamber and the relative position of the diffuser means may be varied to meet varying conditions of operation.

Thus, Figure 8 shows a rotary internal combustion engine which is designated A, as it is identical with the engine above shown in the form of the invention illustrated in Figure 1 of the drawings. Attached to the engine is a pulse equalizing energy converter generally designated B'.

The pulse equalizing energy converter B' similar to the form of the invention shown in Figure 1 has an elongated cylindrical form and consists of an outer cylindrical tube or hollow member 30, an inner cylindrical member 31 disposed concentric thereto and a transverse housing 32 inwardly of the end of the outer cylindrical tube 30 having the air intake opening 33.

As is shown in Figures 8 and 10, the inner cylindrical member 31 is relatively short terminating at the air intake side of the housing so that a chamber 34 is formed in the outer cylindrical tube or member 30 which communicates with the air intake opening 33 to receive air tangentially therefrom.

The housing 32 is provided with a flange 35, a radially extending slightly arcuate vane 36 substantially perpendicular to the axial line of the equalizing energy converter B' and transversely of the housing 32 and a helical vane or guide 37 which is connected at opposite ends to the respective sides of the housing as at 38 and 39 and at the inner side of the helix to the outer circumference of the inner cylindrical tube 31 as at 40 and at the outer side of the helix as at 41 to the inner circumference of the outer tube 30 whereby the chamber 34 is delineated from the annular outlet or swirl chamber 42 of the equalizing energy converter B'.

The chamber 34 communicates through a passage 43 with the inlet 7 of the engine A, above described for the form of the invention shown in Figure 1. The annular outlet or swirl chamber 42 similar to the form of the invention shown in Figure 1 communicates with the exhaust outlet 8 of the engine at one end through the connecting passage 44.

The equalizing energy converter B' is also provided with a slidably mounted frusto-conical member 45 which acts both to narrow the end of the swirl chamber 42 remote from the passage connected end and to adjust the length of the swirl chamber and to support the diffuser elements 46.

Member 45 is shown in Figure 10 as a hollow member frustoconical in cross section with its inner end slidably mounted about the outer circumference or periphery of the inner cylindrical tube 31. A plurality of circumferentially disposed diffuser elements 46 are connected between the outer circumference or periphery of the member adjacent the end thereof remote from the slidably mounted end and an annular connecting element 47. The annular connecting element 47 when in adjusted position is held to the outer cylindrical tube or member 30 by an annular spacer element 48 and any suitable type of connecting means such as flanges 49 provided on the respective elements 30, 48 and 50 of the equalizing energy converter by threaded members 50a.

Figure 9:
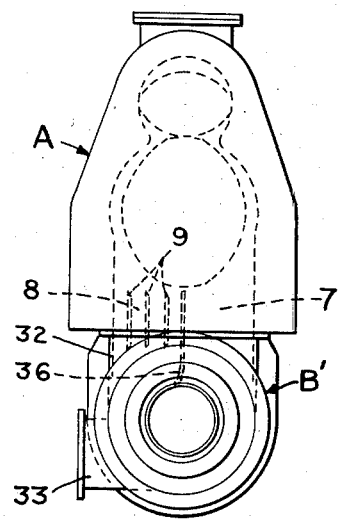
Figure 9 is an end view of the invention as shown in Figure 8.
Figure 7:
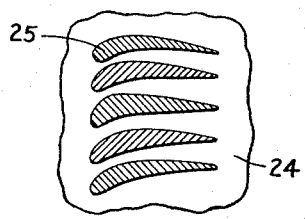
Figure 7 is a cross-section showing a fragment of the diffuser elements.
Figure 6:
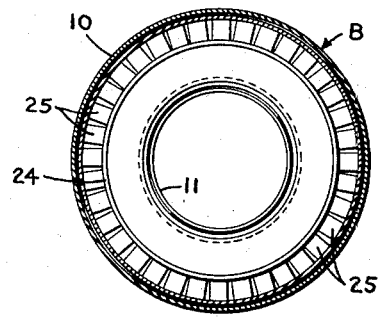
Figure 6 is a cross-section taken on line 6—6 of Figure 1.

The annular connecting element 47 also forms the discharge outlet 51 for the pulse equalizing energy converter B', all of which is clearly shown in Figures 8, 9, and 10 of the drawings.

Operation of equalizing energy converter B' shown in Figure 8

The engine is placed in operation as above described.

Air is continuously fed tangentially into the chamber 34 at either atmospheric or super-atmospheric pressure, as desired, it being understood that this equalizing energy converter B', as in the form of the invention shown in Figure 1, could also be utilized to adapt the engine for efficient operation with air delivered at atmospheric pressure.

The entering or intake air passes from the chamber 34 through passage 43 into the inlet 7 of the engine where it is utilized in the combustion cycle of the engine extending through the exhaust outlet 8 through passage 44 into the swirl chamber 42. After passing a portion of the length of the chamber 42 as in the form of the invention shown in Figure 1, the rotating mass of exhausting gas and intake gas will have mixed thoroughly and formed at substantially constant velocity, pressure and temperature.

The rotating mass of gas then flows through the narrow section of the swirl chamber 42 causing the axial velocity to increase for the purposes above set forth whence it is led into the diffuser elements 46 where the kinetic energy is changed into pressure energy for any desired purpose.

By adjusting the position of the frusto-conical member 45 the length of the swirl chamber 42 may be tuned to secure the highest pressure in the discharge outlet space 51 beyond the diffuser elements 46 and thereby the best conditions of operation may be obtained for varying conditions under which the engine may be operated.

Exhaust pulse equalizing energy converter B" shown in Fig. 12 of the drawings In the form of the invention shown in Figure 12 the equalizing energy converter varies from that shown in Figures 1 and 2 in that the axially disposed cascade of diffuser elements and the frusto-conical elements are replaced by a radial diffuser means. In the illustrated form of the invention, the diffuser is shown having radial vanes. However, it is believed clear that the diffuser could be designed without vanes to produce a mean static pressure in the diffuser and adjoining exhaust piping which is higher than the mean static pressure in the swirl chamber.

Thus, referring to Figure 12, we find a rotary internal combustion engine which is once again designated A, as it is identical with that above described for Figure 1 of the drawings. Attached to the engine is the pulse equalizing energy converter generally designated B".

The equalizing energy converter B" as shown in Figure 12 is a substantially elongated cylindrical member including an outer cylindrical tube or hollow vessel 60 and an inner cylindrical tube or member 61 disposed substantially concentric thereto. Transversely of the respective vessel and member is a housing 62 having a radial vane 63 and a helical vane or guide 64, the construction of this portion of the equalizing energy converter B" being in all respects similar to the construction above described for Figure 1 of the invention.

Thus, the housing acts to divide the pulse equalizing energy converter so that it forms an annular inlet chamber 65 on one side thereof which is connected by a passage 66 with the inlet 7 of the engine and an annular outlet or swirl chamber 67 which communicates through a passage 68 with the exhaust outlet 8 of the engine as in the case of the pulse equalizing energy converter B above described.

This form of the invention differs however in that at a predetermined distance from the point where the swirl chamber 67 communicates with the passage 68 an annular chamber generally designated 69 is formed on the outer circumference of the outer tube or hollow vessel 60 which has its inlet opening radially into the annular swirl chamber 67 of the equalizing energy converter B" and its outlet connected to a scroll-like diffuser 70 in turn having an outlet 71, all of which is clearly shown in Figures 12 and 13 of the drawings.

The annular chamber 69 is narrower than the swirl chamber 67 and thus acts in the same manner as the axial narrowing of the swirl chamber produced by the frusto-conical members 24 and 45 shown in the form of the invention in Figures 1 and 10 of the drawings. The gaseous mixture exhausts through this narrow annular passage 69 into the scroll-like diffuser 70 where the kinetic energy is converted to useful energy in the manner well known in the art.

Figures 12 and 13 further show radially extending vanes 72 mounted transversely in the annular chamber 69. These vanes aid in changing the kinetic energy to pressure energy for any desired use.

It will be understood that the invention is not to be limited to the specific construction or arrangement of parts shown but that they may be widely modified within the invention defined by the claims.

What is claimed is:

1. A pulse equalizing energy converter for use with a rotary combustion engine having an air inlet and an exhaust outlet for receiving and delivering respectively inlet air and exhaust gases from and to the pulse equalizing energy converter, said pulse equalizing energy converter comprising a plurality of concentric vessels forming an annular space therebetween, a housing for said pulse equalizing energy converter having a first and second port, said first port operating to communicate a portion of said annular space with the inlet of said rotary combustion engine and said second port operating to communicate the other portion of said annular space with the exhaust of said rotary combustion engine, air inlet and outlet means disposed in the portion of said annular space for communication with the inlet of said rotary combustion engine, an inlet and discharge means disposed in the portion of said annular space for communication with the exhaust of said rotary combustion engine, a helical partition disposed in said housing and to divide the portion of said annular space communicating with the inlet of said rotary combustion engine through said first port into an air inlet chamber and the portion for communication with the exhaust of said rotary combustion engine through said second port into a swirl chamber, and said helical partition disposed in said housing being positioned in said annular space to prevent direct flow of air passing into the air inlet to said swirl chamber and said helical partition in spaced relation with the first and second port whereby one side of said helical partition directs air flowing into said air inlet chamber into the inlet of said rotary combustion engine and the other side of said partition causes exhaust gases from the exhaust outlet of said engine to pass to the inlet of said swirl chamber, in a helical fashion, and the swirl chamber formed by a portion of the annular space formed between the walls of the concentric vessels being of a predetermined dimension to permit a blending together of the pulses of exhaust gases passed to said swirl chamber from said rotary combustion engine to provide a source of usable energy.

2. A pulse equalizing energy converter for use with a rotary combustion engine having an air inlet and an exhaust outlet for receiving and delivering respectively inlet air and exhaust gases from and to the pulse equalizing energy converter, said pulse equalizing energy converter comprising a plurality of concentric vessels forming an annular space therebetween, a housing for said pulse equalizing energy converter having a first and second port, said first port operating to communicate a portion of said annular space with the inlet of said rotary combustion engine and said second port operating to communicate the other portion of said annular space with the exhaust of said rotary combustion engine, air inlet and outlet means disposed in the portion of said annular space for communication with the inlet of said rotary combustion engine, an inlet and discharge means disposed in the portion of said annular space for communication with the exhaust of said rotary combustion engine, a helical partition disposed in said housing and to divide the portion of said annular space communicating with the inlet of said rotary combustion engine through said first port into an air inlet chamber and the portion of said annular space for communication with the exhaust of said rotary combustion engine through said second port into a swirl chamber, and said helical partition disposed in said housing being positioned in said annular space to prevent direct flow of air passing into the air inlet means to said swirl chamber and said helical partition in spaced relation with the first and second port whereby one side of said partition directs air flowing into said air inlet chamber into the inlet of said rotary combustion engine and the other side of said partition causes exhaust gases from the exhaust outlet of said engine to pass to the inlet of said swirl chamber in a helical fashion, and the swirl chamber formed by the annular space between the walls of the concentric vessels being of a predetermined dimension to permit a blending together of the pulses of exhaust gases passed to said swirl chamber from said rotary combustion engine to provide a source of usable energy, and means connected in said annular space adjacent the outlet end of the swirl chamber to convert the velocity energy of the gases in the swirl chamber to pressure energy.

3. In a pulse equalizing energy converter as claimed in claim 2 wherein the means adjacent the outlet end of the swirl chamber comprises turning vanes connected between the concentric vessels substantially transverse of the axial line of the swirl chamber.

4. In a pulse equalizing energy converter as claimed in claim 2 wherein means are connected to the concentric vessels at the outlet end of the swirl chamber to permit the swirl chamber length to be fixed to a desired predetermined length for the conditions of operation.

5. A pulse equalizing energy converter for use with a rotary combustion engine having an air inlet and an exhaust outlet for receiving and delivering respectively inlet air and exhaust gases from and to the pulse equalizing energy converter, said pulse equalizing energy converter comprising a plurality of concentric vessels forming an annular space therebetween, a housing disposed about said pulse equalizing energy converter and said housing including a vane for dividing said housing into first and second walled chambers forming first and second ports for respective connection with the inlet and exhaust of said rotary combustion engine, said first port operating to communicate a portion of said annular space with the inlet of said rotary combustion engine and said second port operating to communicate the other portion of said anular space with exhaust of said rotary combustion engine, air inlet and outlet means disposed in the portion of said annular space for communication with the inlet of said rotary combustion engine, an inlet and discharge means in the portion of said annular space for communication with the exhaust outlet of said rotary combustion engine, a helical vane mounted in said housing and at its inner periphery connected to the inner of said concentric vessels and said helical vane connected at its outer periphery to the outer of said concentric vessels and said helical vane connected at one end to the wall of one of said chambers and at its other end to the opposite wall of the other of said chambers, and said helical vane disposed in said annular space to divide a portion of said annular space communicating with the inlet of said rotary combustion engine through said first port into an air inlet chamber and the portion of said annular space for communication with the exhaust of said rotary combustion engine through said second port into a swirl chamber, and said helical vane in association with the rotary combustion engine to prevent direct flow of air passing into the air inlet means to said swirl chamber and said helical vane in spaced relation with the first and second port whereby one side of said helical vane directs air flowing into said air inlet chamber into the inlet of said rotary combustion engine and the other side of said helical vane causes exhaust gases from the exhaust outlet of said engine to pass to the inlet of said swirl chamber in a helical fashion, and the swirl chamber formed by the annular space between the walls of the concentric vessels being of a predetermined dimension to permit a blending together of the pulses of exhaust gases passed to said swirl chamber from said rotary combustion engine to provide a source of usable energy.

6. A pulse equalizing energy converter for use with a rotary combustion engine having an air inlet and an exhaust outlet for receiving and delivering respectively inlet air and exhaust gases from and to the pulse equalizing energy converter, said pulse equalizing energy converter comprising a plurality of concentric vessels forming an annular space therebetween, a housing disposed about said pulse equalizing energy converter and said housing including a vane for dividing said housing into first and second walled chambers forming first and second ports for respective connection with the inlet and exhaust of said rotary combustion engine, said first port operating to communicate a portion of said annular space with the inlet of said rotary combustion engine and said second port operating to communicate the other portion of said annular space with exhaust of said rotary combustion engine, air inlet and outlet means disposed in the portion of said annular space for communication with the inlet of said rotary combustion engine, an inlet and discharge means in the portion of said annular space for communication with the exhaust outlet of said rotary combustion engine, a helical vane mounted in said housing and at its inner periphery connected to the inner of said concentric vessels and said helical vane connected at its outer periphery to the outer of said concentric vessels and said helical vane connected at one end to the wall of one of said chambers and at its other end to the opposite wall of the other of said chambers, and said helical vane disposed in said annular space to divide a portion of said annular space communicating with the inlet of said rotary combustion engine through said first port into an air inlet chamber and the portion of said annular space for communication with the exhaust of said rotary combustion engine through said second port into a swirl chamber, and said helical vane in association with the rotary combustion engine to prevent direct flow of air passing into the air inlet means to said swirl chamber and said helical vane in spaced relation with the first and second port whereby one side of said helical vane directs air flowing into said air inlet chamber into the inlet of said rotary combustion engine and the other side of said helical vane causes exhaust gases from the exhaust outlet of said engine to pass to the inlet of said swirl chamber in a helical fashion, and the swirl chamber formed by the annular space between the walls of the concentric vessels being of a predetermined dimension to permit a blending together of the pulses of exhaust gases passed to said swirl chamber from said rotary combustion engine to provide a source of usable energy, and means connected in said annular space adjacent the outlet end of the swirl chamber to convert the velocity energy of the gases in the swirl chamber to pressure energy.

7. In a pulse equalizing energy converter as claimed in claim 6 wherein the means adjacent the outlet end of the swirl chamber comprises turning vanes connected between the concentric vessels substantially transverse of the axial line of the swirl chamber.

8. In a pulse equalizing energy converter as claimed in claim 6 wherein means are connected to the concentric vessels at the outlet end of the swirl chamber to permit the swirl chamber length to be fixed to a desired predetermined length for the conditions of operation.

(References on following page)

References Cited in the file of this patent

UNITED STATES PATENTS

| | | |
|---|---|---|
| 1,246,159 | Ricardo et al. | Nov. 13, 1917 |
| 1,255,403 | Gardner et al. | Feb. 5, 1918 |
| 1,760,682 | Boysen | May 27, 1930 |
| 2,102,559 | Kadenacy | Dec. 14, 1937 |
| 2,173,550 | Coanda | Sept. 19, 1939 |
| 2,228,194 | Birkigt | Jan. 7, 1941 |
| 2,387,707 | Woolley | Oct. 23, 1945 |
| 2,583,430 | Kadenacy | Jan. 22, 1952 |
| 2,625,006 | Lundquist | Jan. 13, 1953 |
| 2,666,453 | Davidson et al. | Jan. 19, 1954 |

FOREIGN PATENTS

| | | |
|---|---|---|
| 258,671 | Switzerland | May 2, 1949 |